United States Patent [19]

Buchfeld

[11] 4,325,125
[45] Apr. 13, 1982

[54] APPARATUS FOR ORIENTING OUT-OF-ROUND WORKPIECES

[75] Inventor: Jürgen Buchfeld, North Muskegon, Mich.

[73] Assignee: Goetze AG, Burscheid, Fed. Rep. of Germany

[21] Appl. No.: 192,255

[22] Filed: Sep. 30, 1980

Related U.S. Application Data

[63] Continuation-in-part of Ser. No. 1,911, Jan. 8, 1979, abandoned.

[30] Foreign Application Priority Data

Dec. 21, 1979 [DE] Fed. Rep. of Germany ....... 2951605

[51] Int. Cl.³ .................... G06F 15/46; G05B 15/02
[52] U.S. Cl. .................................. 364/474; 318/640; 358/107; 364/168
[58] Field of Search .................. 364/107, 474, 559; 358/96, 107; 318/640

[56] References Cited

U.S. PATENT DOCUMENTS

| | | | |
|---|---|---|---|
| Re. 30,016 | 5/1979 | Hohn | 364/474 |
| 2,910,910 | 11/1959 | Rosenfeld et al. | 358/96 |
| 3,502,882 | 3/1970 | Von Vorus | 364/474 |
| 3,595,106 | 7/1971 | Pomella | 364/474 |
| 3,633,011 | 1/1972 | Bederman et al. | 364/107 |
| 4,027,245 | 5/1977 | Bourrat et al. | 364/474 |
| 4,118,730 | 10/1978 | Lemelson | 358/107 |
| 4,123,695 | 10/1978 | Hale et al. | 318/640 |
| 4,146,924 | 3/1979 | Birk et al. | 318/640 |

Primary Examiner—Errol A. Krass
Attorney, Agent, or Firm—Spencer & Kaye

[57] ABSTRACT

An arrangement for orienting an out-of-round workpiece into desired angular and lateral positions for a machining operation. The arrangement places the workpiece into a first location; determines the actual angular and lateral positions of the workpiece in the first location; determines the deviations between the respective desired and actual positions; moves the workpiece from the first location into a second location; and reorients the workpiece into the desired angular and lateral positions dependent upon correctional values derived from the above-noted deviations.

7 Claims, 2 Drawing Figures

… (1)

APPARATUS FOR ORIENTING OUT-OF-ROUND WORKPIECES

CROSS-REFERENCE TO RELATED APPLICATION

This is a continuation-in-part of application Ser. No. 1,911, filed Jan. 8th, 1979, now abandoned.

BACKGROUND OF THE INVENTION

This invention relates to a method and an apparatus for orienting out-of-round workpieces, particularly piston rings or synch rings prior to the circumferential machining thereof. For achieving the desired orientation, the actual position of the workpiece is determined and compared with a predetermined desired position and then the deviational values are utilized for correcting the position of the workpiece.

For machining the inner and outer circumferential faces of out-of-round piston blanks, a lathe of the type disclosed in U.S. Pat. No. 3,326,393 may be used. According to this patent, the piston rings which are clamped into the lathe as a stack, are rotated and are simultaneously machined at their inner and outer circumferential surfaces by means of cutting tools. The latter are radially displaceable by means of control cams which operate as a function of the desired out-of-round contour of the piston rings. Subsequent to the machining, the ring stack is introduced into a cutting apparatus to cut through each closed continuous ring for providing the ring gap therein.

For aligning (orienting) the piston ring blanks prior to their stackwise introduction into the lathe an auxiliary apparatus has been used which constitutes a preparing station and which is formed essentially of a cantilevered carrier on which a number of piston ring blanks (corresponding to the number of rings in the stack) can be loosely inserted. The uppermost bounding edge of the carrier is a rotatable bar on which the piston ring blanks lie under their own weight with their inner circumferential faces and thus travel in the circumferential direction as the bar is rotated. Each piston ring blank is provided with a notch at the inner circumference in the zone of the intended gap to ensure that the respective ring remains suspended on the rotating bar without further angular displacement, despite the continued rotation of the bar. In this manner all piston ring blanks are "aligned" in the carrier, that is, they are brought into a particular angular orientation and are subsequently removed from the carrier by a gripper which advances the stack—in the oriented position of the rings—to the machining station of the lathe. Such a known aligning process by means of piston ring notches and a rotating bar is described, for example, in Carl Englisch: *KOLBENRINGE (Piston Rings)*, Volume I, page 285 (published by Springer-Verlag, Vienna, Austria, 1958).

It is a disadvantage of the above-outlined aligning process that it requires a relatively long period until all the piston ring blanks have assumed their desired position. There is further the risk that individual piston rings remain suspended at an already stationary piston ring and thus never reach their desired angular orientation. Because of such a possibility, an additional visual monitoring by the operating personnel is required. Further, the notch provided in the piston ring blank adversely affects the machining operation. In particular, the short-period abrupt interruptions of the machining operation lead to resonance phenomena which manifest themselves as chatter marks on the ring and which significantly reduce the service life of the cutting tool.

German Laid-Open Application (Offenlegungsschrift) No. 2,705,200 discloses a method and an apparatus for an angularly oriented clamping of workpieces. According to the disclosure therein, the workpiece is immobilized in an approximate position on a movable platform and is scanned along selected portions of its external contour. Subsequently, the platform, according to the determined deviations between desired and actual positional values, is shifted and/or rotated. This known process is concerned with the predetermined positional alignment of relatively large workpieces which, already prior to scanning, have to be clamped on a pivotal and rotatable platform which, at the same time, serves as a receiver of the workpieces for the subsequent machining thereof. In the individual machining of such relatively large workpieces the time required for the workpiece orientation is negligibly small as compared to the relatively long machining operation.

In case of mass-manufactured components, particularly annular workpieces, a stackwise machining is a desideratum. For such an operation, the out-of-round workpieces have to be aligned individually in a predetermined manner and only after such an orientation are they clamped into a workpiece stack.

SUMMARY OF THE INVENTION

It is an object of the invention to provide an improved method and apparatus of the above-outlined type by means of which a correction (reorientation) of the workpiece position can be effected in a particularly simple and rational manner without the necessity of providing particular markings on the workpieces and without the need of additional time for the positional correction.

This object and others to become apparent as the specification progresses, are accomplished by the invention, according to which, briefly stated, the workpiece is scanned in its not-yet-oriented position, its actual position is compared with the desired position and by means of the correctional values obtained from the difference between the desired values and the actual values, the workpiece is re-oriented into the desired position during its transportation from the location where its scanning was performed. Such a re-orientation is completed by the time the workpiece is clamped for further handling (for example, for machining or for moving to a lathe).

The invention as outlined above, is based on the earlier-described machining process according to which, while a workpiece stack is machined in a lathe, the workpiece stack next to be machined is to be assembled such that all the individual workpieces are in the desired aligned orientation.

The method according to the invention needs no marking on the workpieces by notches or the like, because the out-of-round contour of the workpiece itself serves for the predetermined orientation of the workpiece. Since each workpiece has to be scanned, it is indispensable to convey each workpiece from the scanning station to a stack-building station if the workpieces are machined stackwise. Thus, according to the invention, the conveying step for each individual workpiece is so performed that during such transportation the workpiece is re-oriented according to the above-discussed correctional values. As a result, the workpieces arrive into the stack-building station in their desired aligned orientation. In the stack-building station the workpieces are clamped together to form a workpiece stack or are further advanced to a lathe or the like for machining. By virtue of this process no separate time period is needed for aligning the workpieces.

According to a further feature of the method according to the invention, the workpieces are scanned preferably without contact and are in an unclamped, free state during the scanning operation. Particularly in case of high-precision items, such as piston rings, a clamping of the individual workpieces would lead to a deformation, so that the actual circumferential contour of the out-of-round workpiece could no longer be determined with high precision. The same applies to a scanning which operates with workpiece contact where, in addition, a clamping of the workpiece is also necessary.

The apparatus for performing the above-outlined method comprises a plate-like workpiece receiving platform and a scanning device. According to the invention each workpiece can be positioned loosely on the platform. The scanning device is rotatable relative to the workpiece platform, approximately about a workpieces axis which passes through the center of the workpiece. In this manner, the magnitudes of circumferential (angular) and central (lateral) deviations can be maintained at a minimum value from the beginning. Advantageously, the workpiece platform is provided with stops against which the workpiece edges abut and which ensure an at least coarse positional orientation of the workpiece.

According to an advantageous feature of the invention, the workpiece platform is transparent and the scanner is of the electro-optical type.

According to a further advantageous feature of the invention, for the transport of the workpiece and the simultaneous positional correction of the workpiece there is used a gripper which is supported for displacement radially to the axis of the workpiece and parallel thereto; these two types of motions can be individually controlled.

Basically, as regards the invention, it is of no significance whether the workpiece is advanced from the scanning station directly to a machining station (which would be expedient if the workpieces are individually machined) or whether the scanned workpieces are first advanced to an intermediate station for stack-building. In the latter case, the conveying device of the apparatus may be complemented by an intermediate magazine for receiving the workpieces and transmitting them in a positionally corrected state. The total correctional motion to be performed by the conveying arrangement according to the invention may be so divided that the gripper performs the radial (lateral) correctional motion, whereas the intermediate magazine effects the circumferential (rotational) correction. For this purpose, there is provided an intermediate magazine which is rotatable about the longitudinal axis of the workpiece and which can be individually controlled.

DESCRIPTION OF THE PREFERRED EMBODIMENT

Figure 1:
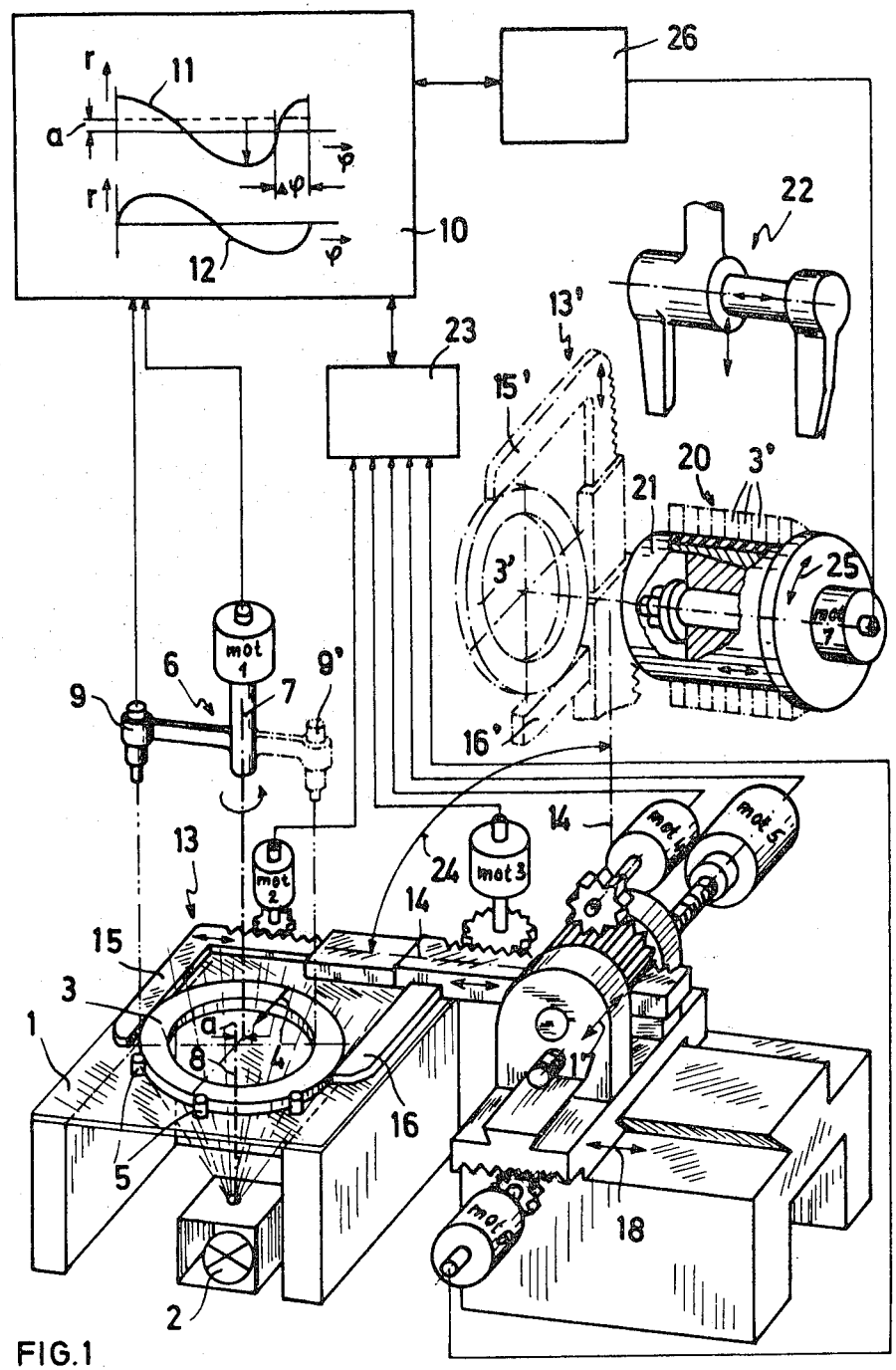
FIG. 1 is a schematic perspective view of a preferred embodiment of the invention.

Turning now to FIG. 1, a workpiece-receiving platform 1 made of transparent material such as synthetic glass is supported in a horizontal orientation and is illuminated by a light source 2. The workpiece which may be, for example, an out-of-round piston ring 3, is advanced manually or by a supporting device (not shown) onto the platform 1 in the direction of the arrow 4 in a random orientation and is approximately centered underneath a rotatable scanning device 6 by means of spaced centering pins (abutments) 5 mounted on the platform 1. Thus, the rotary axis 7 of the scanning device 6 roughly coincides with the piston ring axis 8. The scaning device 6 is rotatable by the electric servo motor mot 1 and determines the inner and/or outer out-of-round circumferential contour of the workpiece 3 by means of at least one scanner 9. The latter determines, in a contactless manner and by electro-optical means, especially with the aid of photocells, the polar coordinate r of the actual contour and applies signals characterizing the sensed values to an electronic computer 10 which may be Model XL68 manufactured by Motorola, Inc. and based on the No. 68000 microprocessor family. In the computer 10 the actual contour 11 is compared with a preprogrammed desired contour 12 and the required angular correction $\Delta \phi$ and center (lateral) deviation a are determined.

The computer 10 applies signals characterizing the correctional values a as electric control magnitudes to a path control unit 23 of a transfer device. The workpiece transfer device comprises a gripper 13 for grasping the workpiece, such as the out-of-round piston ring 3, on the workpiece-receiving platform 1. The gripper 13 has gripping arms 15 and 16—driven by electric servo motors mot 2 and mot 3—which can be moved linearly with respect to one another for grasping the workpiece 3, firmly holding it during transfer from the platform 1 and subsequently releasing it when the transfer is completed. Further, the arms 15, 16 of the gripper 13 are displaceable as a unit in a direction parallel to the gripper axis 14. The directions of motion of the gripper 13 controlled electronically by the computer 10 are possible by the electric servo motor mot 4 for pivoting the gripper 13, further by the servo motors mot 5 and mot 6 which can shift the gripper basically in two horizontal directions. After picking up the piston ring 3 by means of the gripper 13, the piston ring is, during the transfer—as indicated by arrow 24—to an intermediate magazine 20 constituted, for example, by a tensioning mandrel 21, laterally displaced by shifting the gripper base as described above by a distance that corresponds to the center deviation a to be corrected. At the same time, the mandrel 21 is rotated by the servo motor mot 7—as indicated by arrow 25—through the correctional angle $\Delta \phi$ for example, by command directly from the computer 10 by means of a control gearing 26 for receiving the piston ring 3 in the corrected position. After transferring the piston ring 3 to the tensioning mandrel 21, the piston ring is immobilized thereon, for example, by local expansion of the mandrel diameter and by enlarging the distance between the gripper arms 15 and 16 at the same moment. Thereafter the tensioning mandrel 21 is rotated back and the gripper is pivoted and shifted back into their initial positions.

The above-described operation is performed on each individual piston ring 3 until a predetermined number of such piston rings are arranged on the tensioning mandrel 21 in the predetermined precise angular orientation. Thereafter, a pliers-like lifter 22 clamps the piston ring stack and removes it from the tensioning mandrel 21 and forwards it into the machining station of a lathe or the like.

DESCRIPTION OF THE FLOW CHART

Figure 2:
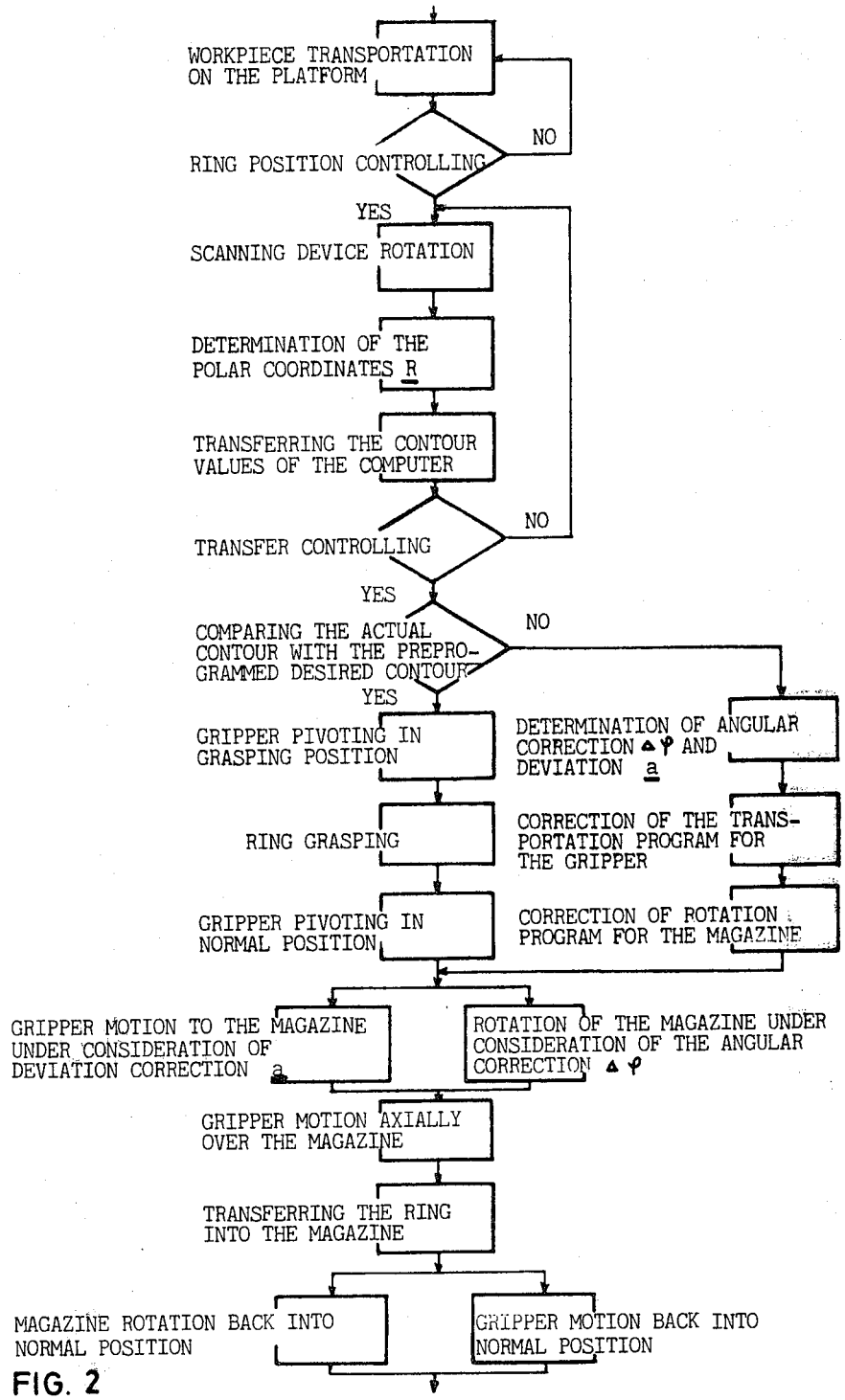
FIG. 2 is a flow chart showing the main operation steps of the invented method.

Additionally to the preferred embodiment the invention is illustrated in the light of the flow chart shown in FIG. 2.

The method of handling is as follows: First the piston ring 3 is transported onto the platform 1. After controlling the presence of the piston ring 3 on the platform 1 the scanning device 9 is switched on for rotation about its axis. If no piston ring 3 is in position on the platform 1 a signal is given back to the ring supporting device (not shown) for transporting a new piston ring in position. During rotation of the scanning device the polar coordinates r of the outer and/or inner ring contour are determined and the values are transferred into the electronic computer 10. It will be understood that it will be sufficient if only the outer or inner contour of the out-of-round piston ring periphery will be determined but preferably both contours are included while a first scanning device 9 is monitoring the outer piston ring contour and a second scanning device 9' is monitoring the inner piston ring contour. The transfer of the polar coordinates is to be controlled. In case of a transfer collapse the scanning devices will have to detect the polar coordinates once more.

In the computer 10 the actual contour 11 of the piston ring periphery is compared with the preprogrammed desired contour 12 and the necessary angular correction $\Delta\phi$ and the center deviation a are determined by the computer. These correction values are to be considered once in the transportation program for the gripper 13 and twice in the rotation program for the magazine 20.

While amending the transporting programs in the computer the gripper 13 is already pivoted in the grasping position so that the piston ring 3 can be grasped and picked up from the platform 1 and pivoted in a so-called normal position between the platform 1 and the magazine 20. During the pivotal motion of the gripper 13, it is movable additionally in at least two directions and further in the vertical directions so as to compensate the center deviation a by computer controlling. At the same time the tensioning mandrel of the magazine 20 is rotated about its own axis under consideration of the angular correction $\Delta\phi$ also controlled by the computer. Then the mandrel is relaxed of tension and the gripper 13 can slip the piston ring on the mandrel for transferring. At least, both the gripper 13 and the magazine 20 can be moved back into their initial respectively normal positions. During these operations the next piston ring is positioned on the platform and its orientation is determined by the scanning devices and is thus ready to be picked up by the gripper.

It will be understood that the above description of the present invention is susceptible to various modifications, changes and adaptations, and the same are intended to be comprehended within the meaning and range of equivalents of the appended claims.

What is claimed is:

1. An apparatus for orienting an out-of-round workpiece into desired angular and lateral positions for a machining operation, comprising in combination:
   (a) a scanning device including a scanner supported for orbital travel about an axis;
   (b) a planar support situated in the vicinity of said scanner and being traversed by said axis; said planar support receiving the workpiece thereon in an at least approximately coaxial relationship with said axis for determining the actual angular and lateral positions of the workpiece on said planar support by scanning the workpiece with said scanner during orbital travel of said scanner relative to the workpiece about said axis;
   (c) transporting means for conveying the workpiece from said planar support to a location spaced therefrom; said transporting means including
      (1) a gripper means for grasping the workpiece at said planar support and for releasing the workpiece at said location; said gripper means having a gripper axis; and
      (2) moving means for displacing said gripper means parallel to and about said gripper axis;
   (d) correcting means for reorienting the workpiece, at a location remote from said planar support, from said actual angular and lateral positions into said desired angular and lateral positions; and
   (e) computer means for storing data on the desired angular and lateral positions of the workpiece; said scanning means being connected to said computer means for applying thereto data on the actual angular and lateral positions of the workpiece; said computer means being connected to said correcting means for applying lateral and angular correcting signals to said correcting means; said lateral and angular correcting signals being derived by said computer means from a comparison between data on said actual and said desired lateral and angular positions.

2. An apparatus as defined in claim 1, further comprising a plurality of abutments secured to said planar support for positioning the workpiece on said planar support in an orientation which at least approximately corresponds to said desired lateral position.

3. An apparatus as defined in claim 1, wherein said scanning device is an electro-optical scanning device.

4. An apparatus as defined in claim 3, wherein said planar support is translucent and further wherein said electro-optical scanning device includes a light source; said scanner and said light source being arranged on opposite sides of said planar support.

5. An apparatus for orienting an out-of-round workpiece into desired angular and lateral positions for a machining operation, comprising in combination:
   (a) a scanning device including a scanner supported for orbital travel about an axis;
   (b) a planar support situated in the vicinity of said scanner and being traversed by said axis; said planar support receiving the workpiece thereon in an at least approximately coaxial relationship with said axis for determining the actual angular and lateral positions of the workpiece on said planar support by scanning the workpiece with said scanner during orbital travel of said scanner relative to the workpiece about said axis;
   (c) a magazine having an axis and being situated at a distance from said planar support for receiving the workpiece from said planar support and holding the workpiece coaxially with the axis of said magazine; said magazine including turning means for rotating the magazine about the axis thereof;

(d) transporting means for conveying the workpiece from said planar support to said magazine; said transporting means including
   (1) a gripper means for grasping the workpiece at said planar support and for releasing the workpiece at said magazine; said gripper means having a gripper axis; and
   (2) moving means for displacing said gripper means from said planar support to said magazine and conversely; and
(e) computer means for storing data on the desired angular and lateral positions of the workpiece; said scanning means being connected to said computer means for applying thereto data on the actual angular and lateral positions of the workpiece; said computer means being connected to said transporting means for applying lateral correcting signals to said moving means whereby the workpiece is re-oriented into said desired lateral position by said gripper means; said computer means being connected to said magazine for applying angular correcting signals to said turning means whereby the workpiece is re-oriented into said desired angular position by said magazine; said lateral and angular correcting signals being derived by said computer means from a comparison between data on said actual and desired lateral and angular positions.

6. An apparatus as defined in claim 5, wherein said intermediate magazine comprises a tensioning mandrel including means for radially expanding the mandrel for immobilizing annular workpieces inserted thereon.

7. An apparatus as defined in claim 5, wherein said moving means includes means for displacing said gripper means parallel to and about said gripper axis.

* * * * *

UNITED STATES PATENT AND TRADEMARK OFFICE
CERTIFICATE OF CORRECTION

PATENT NO. : 4,325,125
DATED : April 13, 1982
INVENTOR(S) : Jürgen Buchfeld

It is certified that error appears in the above—identified patent and that said Letters Patent is hereby corrected as shown below:

On the Title page,
Under "[30] Foreign Application Priority Data" insert --Jan.7, 1978 [DE] Fed. Rep. of Germany .....2800618--.

In Column 4, line 29 change "tion a are" to --tion a are--.
In Column 4, line 31 change "values a as" to --values a as--.

In Column 5, line 46, after "two" insert --horizontal--.

Signed and Sealed this

Seventh Day of September 1982

[SEAL]

Attest:

GERALD J. MOSSINGHOFF

Attesting Officer   Commissioner of Patents and Trademarks